United States Patent
Hild et al.

(10) Patent No.: US 10,739,281 B2
(45) Date of Patent: Aug. 11, 2020

(54) "4D" DYNAMIC TOMOGRAPHY SYSTEM

(71) Applicants: CENTRE NATIONAL DE LA RECHERCHE SCIENTIFIQUE, Paris (FR); ECOLE NORMALE SUPERIEURE DE CACHAN, Cachan (FR)

(72) Inventors: François Hild, Chatenay-Malabry (FR); Hugo Leclerc, Cachan (FR); Stéphane Roux, Rosny-Sous-Bois (FR)

(73) Assignees: CENTRE NATIONAL DE LA RECHERCHE SCIENTIFIQUE, Paris (FR); ECOLE NORMALE SUPERIEURE DE CACHAN, Cachan (FR)

( * ) Notice: Subject to any disclaimer, the term of this patent is extended or adjusted under 35 U.S.C. 154(b) by 640 days.

(21) Appl. No.: 15/318,962

(22) PCT Filed: Jun. 1, 2015

(86) PCT No.: PCT/EP2015/062090
§ 371 (c)(1),
(2) Date: Dec. 14, 2016

(87) PCT Pub. No.: WO2015/193086
PCT Pub. Date: Dec. 23, 2015

(65) Prior Publication Data
US 2017/0131223 A1    May 11, 2017

(30) Foreign Application Priority Data

Jun. 19, 2014  (FR) ..................................... 14 55643

(51) Int. Cl.
*G01N 23/046*   (2018.01)
*G01B 15/06*    (2006.01)
*G01N 3/08*     (2006.01)

(52) U.S. Cl.
CPC ........... *G01N 23/046* (2013.01); *G01B 15/06* (2013.01); *G01N 3/08* (2013.01); *G01N 2223/304* (2013.01); *G01N 2223/607* (2013.01)

(58) Field of Classification Search
CPC ............ G01B 15/06; G01N 2223/607; G01N 23/046; G01N 3/08
See application file for complete search history.

(56) References Cited

U.S. PATENT DOCUMENTS 4,284,895 A * 8/1981 Morgan .................. A61B 6/032
378/9
4,393,305 A * 7/1983 Shimizu ............... G01B 15/025
250/358.1

(Continued)

OTHER PUBLICATIONS

Glenn R. Myers, "Dynamic tomography with a priori information", Applied Optics, vol. 50, No. 20, pp. 3685-3690. (Year: 2011).*

(Continued)

*Primary Examiner* — David J Makiya
*Assistant Examiner* — Soorena Kefayati
(74) *Attorney, Agent, or Firm* — Young & Thompson

(57) ABSTRACT

A tomography scanner includes at least one first emission source (GX1), one first matrix detector (D1), and a computer (C) arranged to produce an initial tomography of an object (E) based on radiographs arising from the first matrix detector, taken from various angles. The tomography scanner further includes a second emission source (GX2) and a second matrix detector (D2) arranged so that, when the object is subjected to a loading that is known at a given instant in time, the computer determines the changes in the object subjected to said loading based only on the information from the first radiograph of the object under loading arising from the first matrix detector, from the second radiograph of the object under loading arising from the (Continued)

second matrix detector and the initial tomograph, the first radiograph and the second radiograph being taken simultaneously at the same given instant in time.

10 Claims, 6 Drawing Sheets

(56) References Cited

U.S. PATENT DOCUMENTS

| | | | | |
|---|---|---|---|---|
| 4,725,963 | A * | 2/1988 | Taylor | G01N 23/18 378/20 |
| 8,068,579 | B1 * | 11/2011 | Yun | G01N 23/046 378/21 |
| 2008/0144908 | A1 * | 6/2008 | West | A61N 5/1031 382/131 |
| 2011/0142315 | A1 * | 6/2011 | Hsieh | A61B 6/032 382/131 |
| 2012/0257713 | A1 * | 10/2012 | Noel | G01N 23/046 378/19 |
| 2014/0295538 | A1 * | 10/2014 | Franck | G01N 3/08 435/288.7 |
| 2014/0307854 | A1 * | 10/2014 | Lauridsen | G01N 23/207 378/73 |
| 2017/0143289 | A1 * | 5/2017 | Fouras | A61B 8/08 |

OTHER PUBLICATIONS

Glenn R. Myers et al., "Dynamic tomography with a priori information," Applied Optics, vol. 50, No. 20, Jul. 10, 2011, pp. 3685-3690, XP001564234.

H. Leclerc et al., "Projection Savings in CT-based Digital Volume Correlation," Experimental Mechanics, May 2, 2014, pp. 1-13, XP055154362.

Stephane Roux et al., "Efficient binary tomographic reconstruction," J. Math Imaging Vision, vol. 49, 2014, pp. 335-351.

* cited by examiner

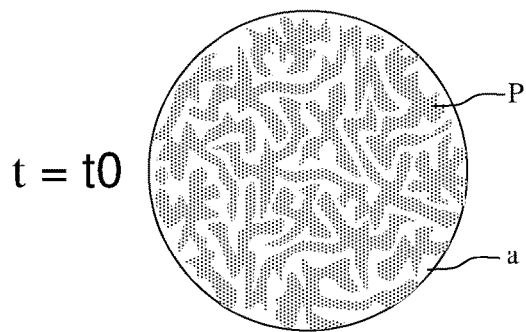
FIG. 3
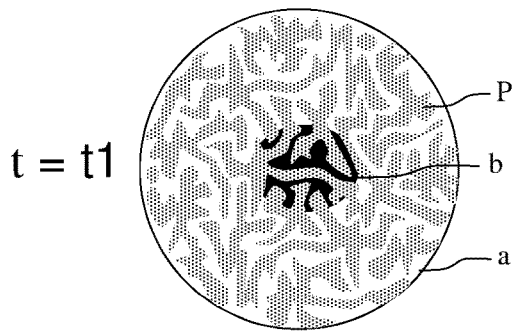   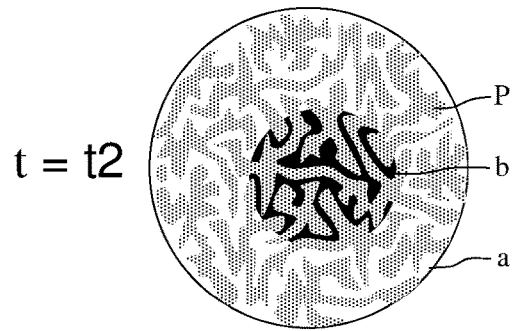
FIG. 4    FIG. 5
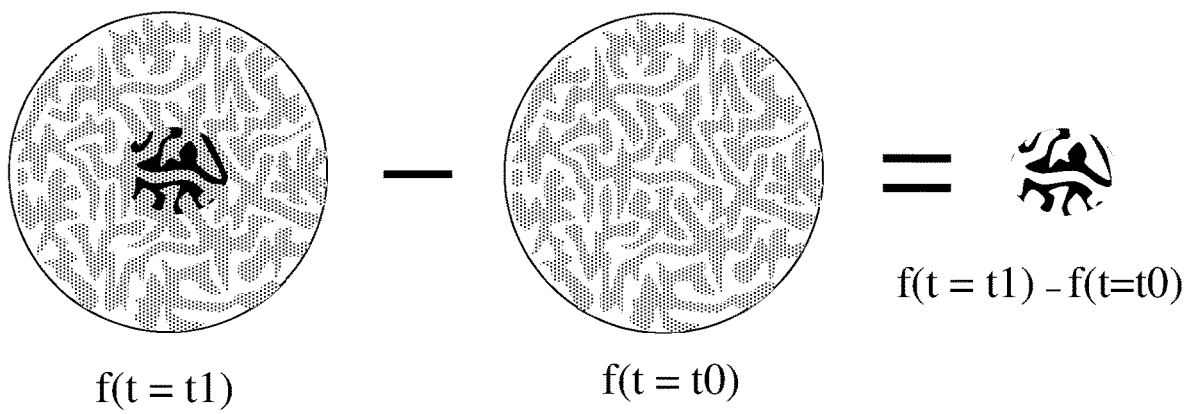
FIG. 6

"4D" DYNAMIC TOMOGRAPHY SYSTEM

CROSS-REFERENCE TO RELATED APPLICATIONS

This application is a National Stage of International patent application PCT/EP2015/062090, filed on Jun. 1, 2015, which claims priority to foreign French patent application No. FR 1455643, filed on Jun. 19, 2014, the disclosures of which are incorporated by reference in their entirety.

BACKGROUND OF THE INVENTION

Field of the Invention

The general field of the invention is that of tomography. The more specific fields of the invention relate to the study of the change over time of materials subjected to controlled loadings in situ. By way of examples, the case of immiscible two-phase flows in a porous medium, at various saturations, may be mentioned, or else that of the mechanical deformation of materials subjected to increasing loadings.

Description of the Related Art

Tomography is a technique consisting of reconstructing the volume of an object on the basis of a series of two-dimensional radiographs taken from various angles. Generally, the radiation used is X-ray radiation, chosen for its ability to pass through matter. This technique is based on the difference in absorption of radiation by the volume elements of the radiographed object. It is thus capable of revealing the presence of non-uniformities such as porosities or grains of various materials.

The main advantage of this technique is to be able to observe the interior of the sample in a non-destructive manner.

The overview of a tomography scanner is shown in FIG. 1. It principally comprises:
- an X-ray generator GX whose energy and intensity are matched to the size and the absorption of the sample E to be analyzed. The X-ray beam is able to pass through a thickness of between a few millimeters and a few centimeters, depending on the nature of the material being passed through and the energy or the frequency of the X-rays;
- a set of motorized plates PM for translational and rotational movements bearing the sample E. The paths are generally of a few tens of centimeters. This set comprises, in particular, a rotating plate allowing the sample E to be turned at an angle $\phi$ over 360 degrees with a high level of precision;
- a matrix detector D whose definition, in terms of rows and columns, is generally a few thousand pixels. By way of example, the detector may be composed of a cesium scintillator converting the X-rays to visible photons, coupled to a photodetector assembly operating in this visible wavelength band. This assembly may be based on CMOS (complementary metal oxide semiconductor) or CCD (charge-coupled device) detectors. The expression $r=(r_1, r_2)$ denotes a frame of reference taken in the plane of the matrix detector and $I(r,\phi)$ denotes the intensity at point r of the radiograph when the sample E has been subject to an angle of rotation $\phi$;
- means for controlling the generator and the various plates, not shown in FIG. 1;
- means for acquiring and processing the various data and for reconstructing the sample in three dimensions on the basis of the various radiographs. These means are represented by a computer C in FIG. 1.

The cologarithm of the intensity, rather than the intensity itself, is used to linearize the absorption which, by its nature, is a decreasing exponential function of the thickness of the sample E passed through. The sinogram s(r, $\phi$) is defined by:

$$s(r, \phi) = -\log\left(\frac{I(r, \phi)}{I_0(r)}\right)$$

where I(r, $\phi$) represents the intensity that has passed through the sample and been received by the detector and $I_0(r)$ represents the received intensity in the absence of a sample.

The three-dimensional image of the analyzed sample is represented by the radiographic density $f(x)$ at point x. The "reconstruction" is the inverse Radon transform or linear mathematical function, denoted by R, which allows $f(x)$ to be calculated on the basis of the set of radiographs:

$$f(x)=R[s(r,\phi)]$$

The points x are also called "voxels", which is a contraction of "VOlumetric piXELs", the term "pixel" itself being a contraction of "PICTure ELement". Depending on their application, their size varies between a fraction of a micrometer and a few hundreds of micrometers. Taking into account the large quantity of data to be processed in order to produce this tomographic reconstruction, it is nowadays common to have recourse to the implementation of a reconstruction algorithm on a graphic processor (GPU, or graphics processing unit).

Currently, when it is desired to track the change over time of a medium subjected, for example, to external mechanical loadings, it is necessary to acquire a series of tomographic images and to analyze them individually.

Immiscible two-phase flows in porous media constitute an important class of problems in which time-resolved three-dimensional imaging is used to characterize these media, for example for the oil industry. Thus, in order to characterize partial permeabilities and capillary pressure at various levels of saturation, it is necessary to image, for various injected volumes of fluid, the entirety of the porous medium and segment the two fluid phases. The procedure is shown in FIG. 2. In a first instance, a tomograph of the reference state of sample E that it is desired to analyze is produced. Denoting the sinogram of the imaged sample by $s_1(r,\phi)$, a first three-dimensional reconstruction $f_1(x)$ is calculated:

$$f_1(x)=R[s_1(r,\phi)]$$

In a second instance, the desired loading is applied to the sample. The loading S is symbolically represented by a black chevron arrow in FIG. 2. A second tomograph of the sample E is produced. Denoting the new sinogram of the sample by $s_2(r,\phi)$ a second three-dimensional reconstruction $f_2(x)$ is calculated, the value of which is:

$$f_2(x)=R[s_2(r,\phi)]$$

The information from these two functions allows the transformation T due to the loading S on the sample E to be characterized.

By way of example, FIGS. 3, 4 and 5 schematically represent the same cross section through a porous medium P at various stages of the invasion of the pore space of this cross section by a fluid. Thus, FIG. 3 shows a cross section through the porous medium P in its initial state at time $t_0$.

The porous space is assumed to be saturated by a fluid a which is schematically represented by a white level while the solid skeleton of the porous medium is shown in dark gray. As the porous medium is invaded by a second fluid b, represented in black in FIGS. 4 and 5, the latter gradually occupies the cross section as may be seen in these two figures representing the porous medium at times $t_1$ and $t_2$. Each of these figures requires a large amount of information in order to be characterized. FIG. 6, which shows the difference between the two states $t_1$ and $t_0$, requires a substantially smaller amount of information.

All phenomena relating to growth or to propagation fall under this same class. Thus, the propagation of a crack in a solid in which the variation in contrast linked to the opening of the crack is directly imaged may be described by this same formalism. Solidification leading to a phase separation constitutes another example of these phenomena.

In order to analyze, on the basis of tomographs, the deformation and displacement fields of a sample when it is subjected to a mechanical loading S, a technique referred to as digital volume correlation (DVC) is generally used. Its principle is shown in FIG. 7.

Under the effect of the loading, the points x inside the sample are displaced to the points X(x). The most common assumption in DVC is that the local absorption coefficients have undergone only one movement without further change, namely:

$$f_2(X) = f_1(x)$$

which may also be written as:

$$f_2(X) = f_1(X - U(X)) \quad \text{equation (1)}$$

where U(X) is the Eulerian form of the displacement field.

The displacement field U(X) may be decomposed over a basis of elementary displacement fields $\psi_i$:

$$U(X) = \sum_i a_i \psi_i(X)$$

The fields are, for example, finite element shape functions. The amplitudes $a_i$ are determined by means of minimizing the following functional:

$$\{a\} = \operatorname{argmin}_{\{b_i\}} \iiint (f_2(X) - f_1(X - b_i \psi_i(X)))^2 dX \quad \text{equation (2)}$$

The displacement field U(X) is thus obtained, on the basis of which it is possible to proceed to a quantitative treatment of the deformations, of any potential discontinuities, or any other interpretative processing for the purpose of providing information on the mechanical properties of the sample. During a mechanical test, each loading state requires the acquisition of radiographs and the reconstruction of a corresponding three-dimensional image.

One of the drawbacks of this method is that it requires a very large amount of data to be recorded and processed. For example, if it is desired to have an image definition of the order of 1000 pixels in each direction in space and under the current assumption that the angular sampling is uniform and with an interval such that the largest movement of a material point of the sample between two consecutive radiographs is smaller than a pixel on the detector, it is necessary to record of the order of 3100 radiographs of the sample, the definition of each image being 1000×1000 pixels, namely a total recording of more than three billion pixels. In most applications, recording therefore requires a certain amount of time, often between one and a few hours. During this lapse of time, it is, of course, essential that the sample doesn't change. However, for certain applications, it is impossible to guarantee the stability of the sample if the duration of recording is too long. The power of the X-ray source, or the sensitivity of the detector, are most often the limiting factors when it comes to increasing the rate of acquisition.

Consequently, the duration of recording limits the field of applications for tomography DVC. In particular, it is not possible to record dynamic phenomena.

In general, in order to track the changing image of a material sample undergoing a known transformation T over time t, it makes sense to consider, for each time interval, acquiring a new image, namely $f(x; t)$, whose information content is given by that of a three-dimensional image multiplied by the number of temporal acquisitions $N_t$. The image at time $t_1$ may be described as the effect of a transformation T of the image at time $t_0$, or namely:

$$f(x; t_1) = T[f(x; t_0); p] \quad \text{Equation (3)}$$

In this text, collective notation p groups together the set of parameters which quantitatively and exhaustively define the transformation T. According to this assumption, the information from $f(x; t_0)$ and from the parameters p is sufficient to fully define $f(x; t_1)$. However, there are numerous examples in which the information required to characterize the parameters p is very substantially less than that defining $f(x; t_0)$. The principle of the tomography scanner according to the invention is to measure p instead of $f(x; t_1)$, while processing a number of projections limited to two for each time t. It should be noted that conducting the analysis over a greater number of instants in time may make the analysis more robust and more efficient.

In the case in which the image is "directly" read, such as for the example of two-phase flows in porous media, it is advantageous to focus only on the difference between two successive states, for example times $t_1$ and $t_0$ or times $t_2$ and $t_1$. Thus, FIG. 6 represents the variation in the state of the porous medium between times $t_1$ and $t_0$. Specifically, in this case, the difference concerns only a limited number of voxels, in this instance restricted, on the one hand, by the pore space and, on the other hand, within a region of low expansion. This property is said to be "parsimonious" and is more easily satisfied the higher the frequency of acquisition, thus limiting the differences between two images. Having the initial image available makes it possible to disregard the complexity of the solid skeleton, which remains unchanged. The only expected variations are transitions in the grayscale value of the invaded fluid a toward that of the invading fluid b. Thus, the difference $f(x; t_1) - f(x; t_0)$ may take only the two values 0 or the difference in the grayscale values of the two fluids for an irreversible invasion, and only if, at time $t_0$, the voxel x is occupied by fluid a. This is a problem with parsimonious binary reconstruction. In this case, the transformation T comes down to the addition of the field $f(x; t_1) - f(x; t_0)$, which is binary and parsimonious, and it is these two characteristics that decrease the complexity of the problem. Moreover, the invasion front is limited to the interface between the two fluids, thereby somewhat decreasing the difficulty of the problem still further. The acquisition of a time series of pairs of projections combined with a continuous rotation of the porous medium provides an additional limit to the complexity of the problem. Specifically, once an area has been invaded, it may no longer change. In this case, it may be advantageous to represent the set of the transformations T as a field borne by the pore space and whose value is the time at which the pore was invaded by the second fluid. A single time is enough if this invasion is irreversible. Moreover, the continuity of the invading fluid means that this time of invasion has no local minima.

As seen above, another class of transformation describes the change over time of an object or of a mechanical part by means of its only displacement field. This field may be a simple movement of a rigid body, or it may be more complex movement and attached to a set of moving parts, leading to one or more mechanisms, and which may be characterized by a few kinetic degrees of freedom characterizing the movement of rigid objects with respect to one another.

More generally, deformable objects may be described, in the first instance, by a three-dimensional displacement field whose complexity is generally much lower than that of the microstructure of the object itself. In this case, the transformation T is described by the equation (1), and the parameters p are, in this instance, the components of the displacement field. As seen above, the displacement field U(X) may be decomposed over a basis of elementary displacement fields $$\psi_i: U(X) = \sum_i a_i \psi_i(X)$$

and the amplitudes {a} form the parameters p of the transformation.

The fields $\psi_i$ are, for example, finite element shape functions. Here again, the basis of elementary displacement fields comprises many fewer unknowns than the basis of recorded data. Thus, taking the preceding example, the dimensions of each finite element may be 10 times larger than those of a voxel. Taking into account that the displacement field is calculated along three directions in space, it therefore comprises around 330 times less data than the primary recording of the voxels, namely three million items of data for U(X) versus a billion for $f(X)$.

BRIEF SUMMARY OF THE INVENTION

The tomography system according to the invention takes advantage of this property. As seen above, in order to analyze the movements of a sample under the effect of a loading, the amount of data required is much lower than that required for the initial tomography of the sample. In practice, in a large number of applications, two images of the deformed sample are enough. The algorithm for determining the displacement field requires a few adjustments with respect to the DVC technique described above. Throughout the rest of the text, it will be referred to as P-DVC for "projection-based digital volume correlation".

Thus, the tomography scanner according to the invention comprises the means required to produce two simultaneous radiographs, making it possible to track the change in the deformation of the sample in real time. This type of tomography is referred to as: "Dynamic tomography" or "4D tomography".

More specifically, an object of the invention is a tomography scanner comprising at least one first emission source, one first matrix detector and calculation means arranged to produce an initial tomograph of an object on the basis of radiographs arising from the first matrix detector which are taken from various angles, characterized in that:

the tomography scanner comprises a second emission source, a second matrix detector and;

when the object is subjected to a known loading at a given instant in time, the calculation means determine the changes in the object subjected to said loading based only on the information from a first radiograph of the object under loading arising from the first matrix detector, from a second radiograph of the object under loading arising from the second matrix detector and the initial tomograph, the first radiograph and the second radiograph being taken at the same given instant in time.

Advantageously, the tomography scanner comprises means arranged so as to record a temporal succession of pairs of first and second radiographs so as to reconstruct the change in the object over time.

Advantageously, as the object is a porous medium, the loading is the flow of a second fluid through said porous medium comprising a first fluid.

Advantageously, the loading is a mechanical loading, the object being deformed under this loading.

Advantageously, the calculation means implement an algorithm of P-DVC, or projection-based digital volume correlation, type, the displacement field of the object under loading being determined on the basis of the minimization of functions dependent on the first and second radiographies of the object under loading, and the initial tomography carried out in the reference state.

Advantageously, the first and second emission sources are X-ray sources.

BRIEF DESCRIPTION OF THE DRAWINGS

The invention will be better understood and other advantages will become apparent on reading the following description, which is given by way of non-limiting example, and from the appended figures in which:

FIGS. 3, 4 and 5 schematically represent three successive states of a cross section through a porous medium during an immiscible two-phase flow;

FIG. 6 shows the difference in structure of the porous medium between two instants in time, those of FIGS. 3 and 4, of the flow of the fluid;

DETAILED DESCRIPTION OF THE PREFERRED EMBODIMENTS

Figure 1:
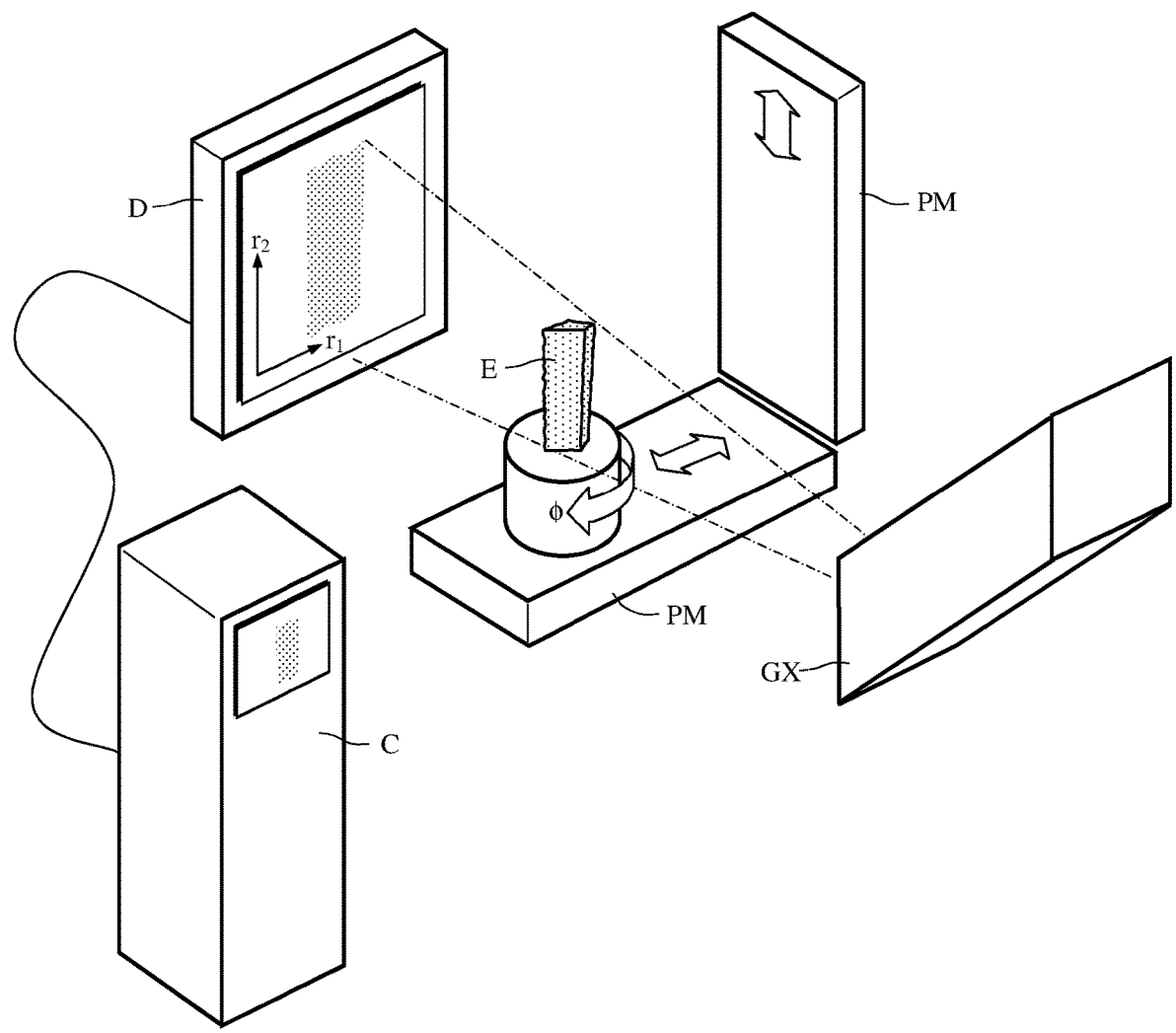
FIG. 1, mentioned above, shows the overview of a tomography scanner according to the prior art.
Figure 2:
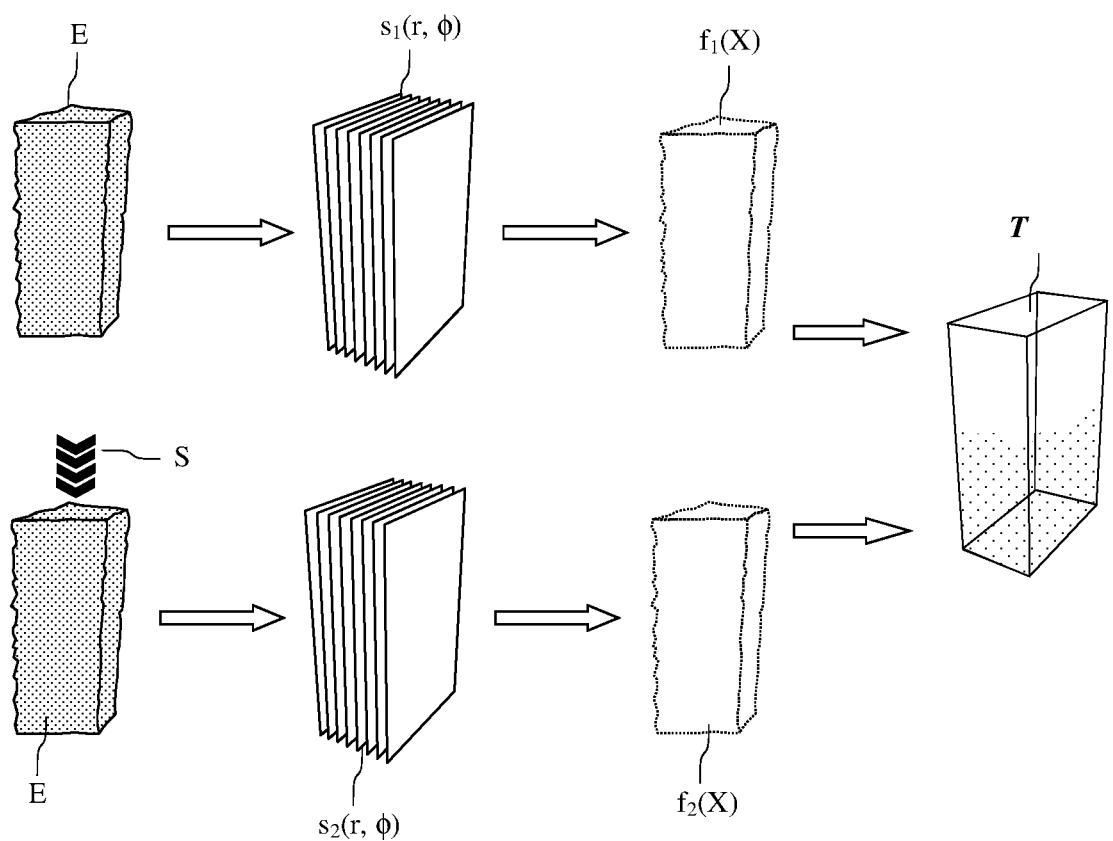
FIG. 2, mentioned above, shows the general principle of a transformation between two states which is analyzed using 3D images of these different states.
Figure 7:
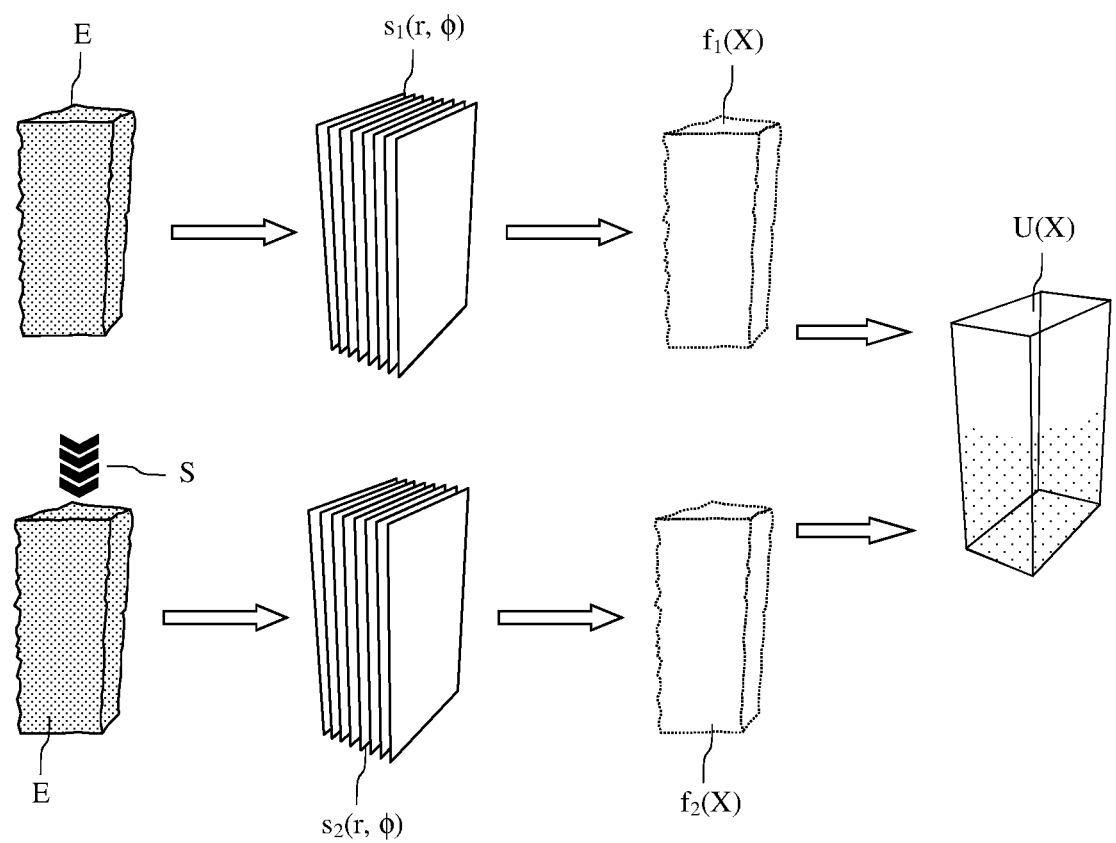
FIG. 7, mentioned above, shows the general principle of a transformation between two states which is analyzed using 3D images of these different states in the particular case of a mechanical deformation analyzed via DVC.
Figure 8:
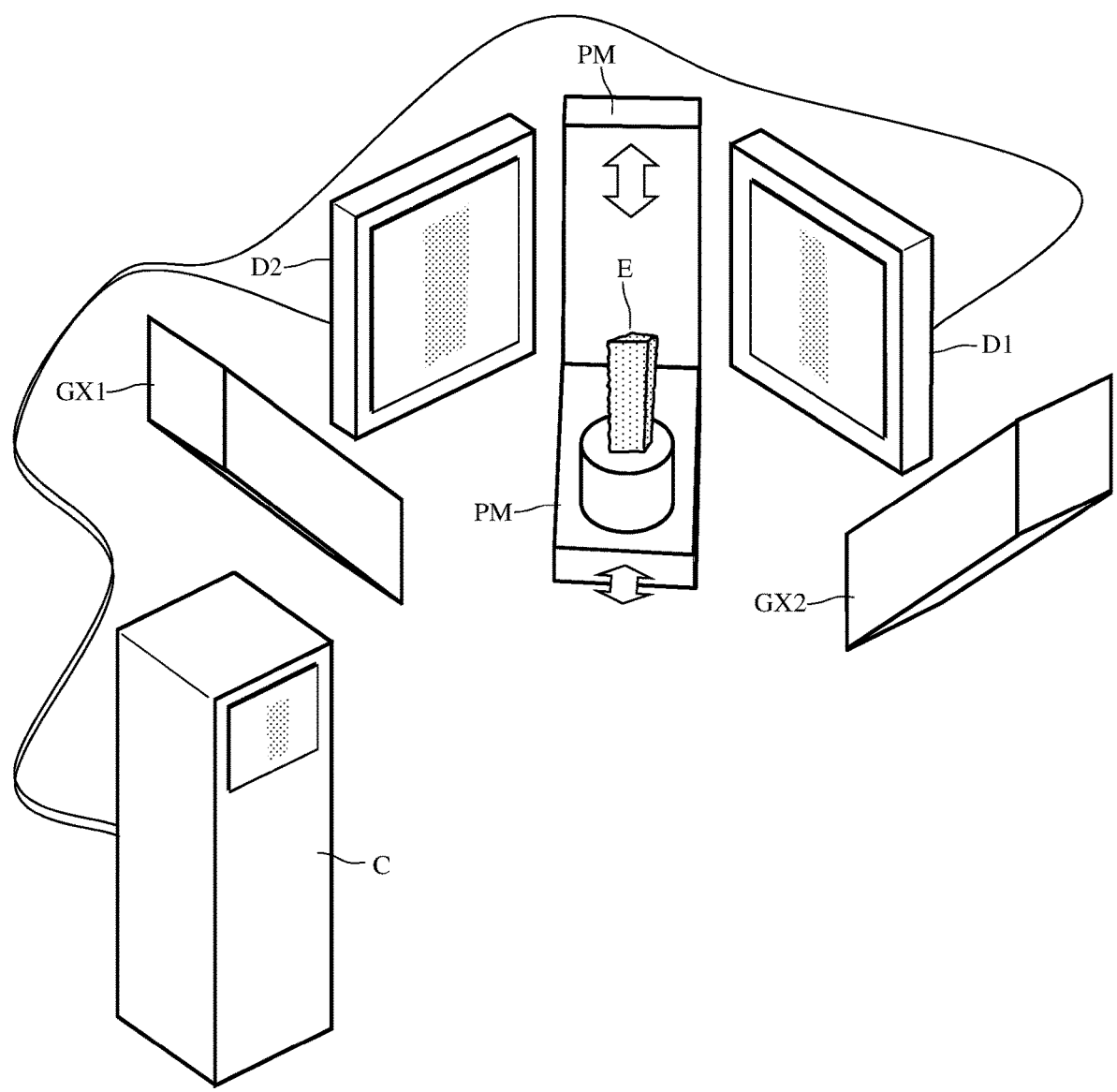
FIG. 8 shows the overview of a tomography scanner according to the invention.

By way of non-limiting example, a tomography scanner according to the invention is shown in FIG. 8. It principally comprises:

two X-ray generators, denoted by GX1 and GX2, whose power is matched to the size and the absorption of the sample E to be analyzed. These generators have substantially the same technical features;

two matrix detectors, D1 and D2, each detector being associated with one of the two X-ray generators. The two detectors are positioned in two different planes. Generally, the two planes are mutually perpendicular. These two detectors have substantially the same technical features. Their definition, in terms of rows and columns, is generally a few thousand pixels. By way of example, the technology employed is based on CMOS (complementary metal oxide semiconductor) detectors with a cesium scintillator.

a set of motorized plates PM for translational and rotational movements bearing the sample E. This set comprises, in particular, a rotating plate allowing the sample E to be turned at an angle θ over 360 degrees with a high level of precision. The plate is positioned so as not to screen the detectors from the generators. The sample is located at substantially identical distances from the two detectors and the two generators;

means for controlling the two generators and the various plates, not shown in FIG. 8;

means for acquiring and processing the various data and for reconstructing the sample in three dimensions on the basis of the various radiographs. These means are represented by a computer C in FIG. 8.

As stated above, the tomography scanner according to the invention finds a large number of applications:

it may be used to characterize two-phase flows in porous media. The technique employed is a variant of the reconstruction adapted to parsimonious and binary fields;

it may be used to measure the movement of a sample of a material subjected to a known loading. The technique employed is a variant of the technique referred to as projection-based digital volume correlation, mentioned above.

In the first case, an exemplary binary reconstruction algorithm is presented in the article entitled "Efficient Binary Tomographic Reconstruction" by S. Roux, H. Leclerc and F. Hild, J. Math Imaging Vis. (2014) 49:335-351.

In the second case, the technique takes inspiration from the principles described in the article entitled "Projection savings in CT-based Digital Volume Correlation" by H. Leclerc, S. Roux and F. Hild, published in "Experimental Mechanics" (DOI 10.1007/s11340-014-9871-5). The fundamental difference between the device described in this article and the tomography scanner according to the invention is that the described device comprises only one X-ray generator and only one detector. Thus, in order to produce two radiographs from two different angles, it is necessary to rotate the sample with the constraints that this involves, the main one being the impossibility to track the change in the sample in real time without disruptions.

Figure 9:
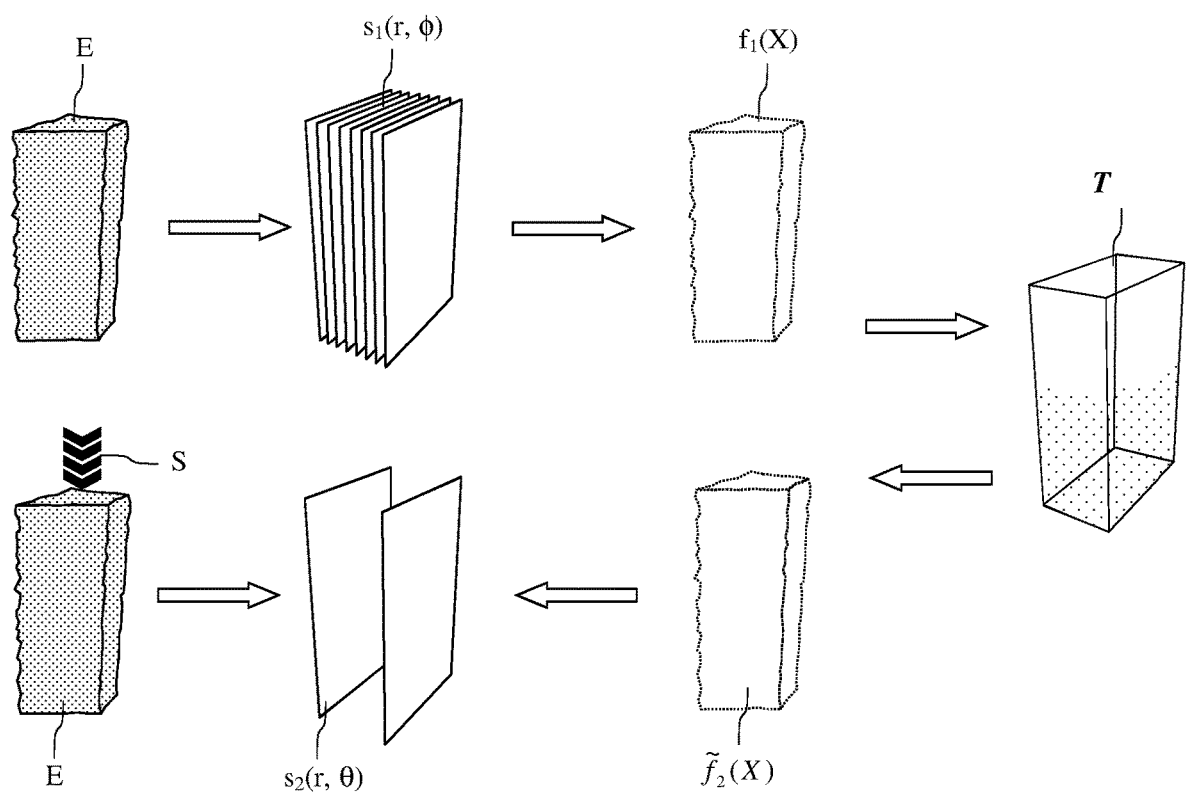
FIG. 9 shows the principle of DVC modified according to the invention.

As above, the measurement comprises two steps. Its principle is shown in FIG. 9.

In a first step, a first tomograph of the sample E that it is desired to analyze is produced conventionally. Denoting the tomographic images of the sample by $s_1(\underline{r},\phi)$, a first three-dimensional reconstruction function $f_1$ is calculated whose value, as above, is:

$$f_1(x)=R[s_i(r,\phi)]$$

This tomograph is produced by the two sets operating simultaneously. The two series of images obtained are brought into correspondence, allowing the two frames of reference of the detectors to be associated.

In a second step, the desired loading S is applied to the sample E. The loading S is symbolically represented by a black chevron arrow in FIG. 9. Just two simultaneous radiographs of the sample E under loading are then produced, the first taken by the first set comprising the first generator GX1 and the first detector D1, the second taken by the second set comprising the second generator GX2 and the second detector D2. By construction, these two radiographs are taken from two different angles θ without requiring the sample to be rotated. These two images are denoted by $s_2(r,\phi)$.

It is known, by virtue of the preceding, that the data arising from the two radiographs are potentially sufficient for calculating the parameters p of the transformation T. Thus, in the particular case of the deformation of a material, the amplitudes {a} of the displacement field are calculated:

$$U(X) = \sum_i a_i \psi_i(X)$$

over the basis of fields $\psi_i(x)$ according to the P-DVC algorithm or equivalent. Conventionally, the fields $\psi_i$ are finite element shape functions. The amplitudes $a_i$ are determined by means of minimizing the following function, close to equation (2), using the same notation as above:

$$\{a\} = \operatorname{argmin}_{\{b\}} \sum_\theta \int\int (s_2(r,\theta) - P_\theta[f_1(X - b_i\psi_i(X))])^2 dr$$

where $P_\theta$ corresponds to the projection of the three-dimensional reconstruction $f_1$ corrected for movement over the planes of the detectors. In the context of the invention, the calculations are carried out on the basis of the information arising solely from the two images $s_2(\underline{r},\theta)$.

According to one possible embodiment of the displacement field calculation according to the P-DVC algorithm, the estimation is carried out via successive iterations n. On each iteration, an artificially deformed reference image is constructed: $\tilde{f}_i(X)$. The relationship is:

$$\tilde{f}_1(X)=f_1(X-a_i^n\psi_i(X))$$

Between two iterations, the simple relationship is:

$$a_i^{n+1}=a_i^n+da_i^{n+1}$$

The correction terms $da_i^{n+1}$ are obtained on the basis of the linearization of the differences in the projected images. The following is defined:

$$g_i^n(r,\theta)=P_\theta[\nabla \tilde{f}_1^n \cdot \Psi_i(X)]$$

The calculation of the correction terms $da_i^{n+1}$ is obtained by solving the following linear system:

$$M_{ij}^n da_{ij}^{n+1} = dB_i^n$$

where $M_{ij}^n = \sum_\theta \int\int g_i^n(r,\theta) g_j^n(r,\theta) dr$ and $dB_i^n = \sum_\theta \int\int (s_2(r,\theta) - P_\theta[\tilde{f}_1^n(X)]) \cdot g_j^n(r,\theta) dr$ The process of iterations is halted as soon as the correction terms fall below a predetermined threshold. In practice, convergence is obtained after about ten iterations.

Thus, the number of radiographs required to determine the displacement field is very substantially decreased. Moreover, by recording a temporal succession of pairs of first and second radiographs, it is possible to reconstruct the change in the displacement field of the object over time, whence the terminology "4D" or "dynamic" tomography.

The main advantage of the tomography scanner according to the invention is to allow dynamic tracking of the change in a sample subjected to a given loading. By way of first example, it may be used to track the dynamic change in the front between two immiscible fluids in a dynamic flow under the effect of an applied pressure. By way of second example, the time dependence of the kinematics of a sample subjected to a mechanical loading may also be analyzed.

A tomography scanner according to the invention, with two sets of sources/detectors, necessarily costs more than a tomography scanner comprising a single assembly. However, the increase in cost is quite limited inasmuch as numerous elements of the tomographic system may be mutualized, such as the radiation protection screens, the motorized plates, the anti-vibration devices or else the air-conditioning systems.

The invention claimed is:

1. A tomography scanner comprising:
   at least one first emission source (GX1),
   one first matrix detector (D1), and
   a computer (C) that produces an initial tomography of an object (E) on the basis of radiographs arising from the first matrix detector, which are taken from various angles,
   a second emission source (GX2), and
   a second matrix detector (D2), wherein, when the object is subjected to a loading whose descriptive framework is known at a given instant in time, the computer determines changes in the object subjected to said loading based only on the information:
      from a first radiograph of the object under loading arising from the first matrix detector,
      from a second radiograph of the object under loading arising from the second matrix detector, and
      from the initial tomograph,
   the first radiograph and the second radiograph being taken simultaneously at the same given instant in time.

2. The tomography scanner as claimed in claim 1, wherein the tomography scanner records a temporal succession of pairs of the first and second radiographs so as to reconstruct the change in the object shape over time.

3. The tomography scanner as claimed in claim 1, wherein as the object is a porous medium, the loading is a two-phase flow of a second fluid through said porous medium comprising a first fluid.

4. The tomography scanner as claimed in claim 1, wherein the loading is a mechanical loading, the object being deformed under the loading.

5. The tomography scanner as claimed in claim 1, wherein the first and second emission sources are X-ray sources.

6. The tomography scanner as claimed in claim 2, wherein as the object is a porous medium, the loading is a two-phase flow of a second fluid through said porous medium comprising a first fluid.

7. The tomography scanner as claimed in claim 2, wherein the loading is a mechanical loading, the object being deformed under the loading.

8. The tomography scanner as claimed in claim 2, wherein the first and second emission sources are X-ray sources.

9. The tomography scanner as claimed in claim 4, wherein the computer implements an algorithm of P-DVC (or projection-based digital volume correlation) type, a displacement field of the object under loading being determined on the basis of the minimization of functions dependent on the first and second radiographs of the object under loading, and the initial full tomography carried out in the reference state.

10. The tomography scanner as claimed in claim 7, wherein the computer implements an algorithm of P-DVC (or projection-based digital volume correlation) type, a displacement field of the object under loading being determined on the basis of the minimization of functions dependent on the first and second radiographs of the object under loading, and the initial full tomography carried out in the reference state.

* * * * *